(12) United States Patent
Penrose et al.

(10) Patent No.: US 7,879,200 B2
(45) Date of Patent: *Feb. 1, 2011

(54) ULTRASONIC TRANSDUCER AND HORN USED IN OXIDATIVE DESULFURIZATION OF FOSSIL FUELS

(75) Inventors: Richard T. Penrose, Cupertino, CA (US); Steven J. Rusconi, Redwood City, CA (US)

(73) Assignee: Nevada Heat Treating, Inc., Newark, CA (US)

( * ) Notice: Subject to any disclaimer, the term of this patent is extended or adjusted under 35 U.S.C. 154(b) by 238 days.

This patent is subject to a terminal disclaimer.

(21) Appl. No.: 12/340,415

(22) Filed: Dec. 19, 2008

(65) Prior Publication Data

US 2009/0223809 A1    Sep. 10, 2009

Related U.S. Application Data

(63) Continuation-in-part of application No. 11/850,648, filed on Sep. 5, 2007, now Pat. No. 7,790,002.

(60) Provisional application No. 60/948,168, filed on Jul. 5, 2007.

(51) Int. Cl.
*C07B 63/02* (2006.01)

(52) U.S. Cl. .............. 204/157.15; 204/157.62; 208/208 R

(58) Field of Classification Search ......... 208/208 R; 204/157.15

See application file for complete search history.

(56) References Cited

U.S. PATENT DOCUMENTS

| | | | |
|---|---|---|---|
| 2,717,319 A | 9/1955 | Bundy | |
| 5,349,499 A | 9/1994 | Yamada et al. | |
| 6,019,167 A | 2/2000 | Bishop et al. | |
| 6,193,905 B1 | 2/2001 | Yamada et al. | |
| 6,402,939 B1 | 6/2002 | Yen et al. | |
| 6,500,219 B1 | 12/2002 | Gunnerman | |
| 6,652,992 B1 | 11/2003 | Gunnerman | |
| 6,771,086 B2 | 8/2004 | Lutz et al. | |
| 7,128,133 B2 | 10/2006 | Costello et al. | |
| 2003/0051988 A1 | 3/2003 | Gunnerman | |
| 2003/0080413 A1 | 5/2003 | Dubhashi | |
| 2004/0079680 A1 | 4/2004 | Gunnerman | |
| 2004/0227414 A1 | 11/2004 | Gunnerman et al. | |
| 2005/0224747 A1 | 10/2005 | Costello et al. | |
| 2005/0274600 A1 | 12/2005 | Gunnerman | |
| 2006/0101919 A1 | 5/2006 | Gunnerman et al. | |
| 2006/0126884 A1 | 6/2006 | Hielscher | |
| 2006/0180500 A1 | 8/2006 | Gunnerman | |
| 2006/0196915 A1 | 9/2006 | Gunnerman | |
| 2006/0260405 A1 | 11/2006 | Gunnerman | |
| 2009/0008293 A1 | 1/2009 | Penrose et al. | |

FOREIGN PATENT DOCUMENTS

| | | |
|---|---|---|
| CA | 2422866 A1 | 4/2002 |
| EP | 0109834 A1 | 5/1984 |
| EP | 0456508 A2 | 11/1991 |
| JP | 2089353 A | 3/1990 |
| KR | 10-2006-0111574 A | 10/2006 |

(Continued)

OTHER PUBLICATIONS

International search report dated Dec. 24, 2008 for PCT Application No. US2008/068828.

*Primary Examiner*—Robert J Hill, Jr.
*Assistant Examiner*—Brian McCaig
(74) *Attorney, Agent, or Firm*—Wilson Sonsini Goodrich & Rosati

(57) ABSTRACT

Devices and improved methods are provided for operation of ultrasonic transducers and horns.

18 Claims, 4 Drawing Sheets

FOREIGN PATENT DOCUMENTS

| | | |
|---|---|---|
| KR | 10-2007-0022765 A | 2/2007 |
| WO | WO 2006/055368 A2 | 5/2006 |
| WO | WO 2006/091337 A2 | 8/2006 |
| WO | WO 2006/091337 A3 | 8/2006 |
| WO | WO 2006/055368 A3 | 12/2006 |
| WO | WO 2007/002625 A2 | 1/2007 |
| WO | WO 2007/002625 A3 | 5/2007 |

ULTRASONIC TRANSDUCER AND HORN USED IN OXIDATIVE DESULFURIZATION OF FOSSIL FUELS

CROSS-REFERENCE

This application is a continuation-in-part application of U.S. patent application Ser. No. 11/850,648 filed on Sep. 5, 2007, now U.S. Pat. No. 7,790,002, which claims benefit of priority to U.S. Provisional Patent Application Ser. No. 60/948,168 filed Jul. 5, 2007, which are incorporated herein by reference in their entirety.

BACKGROUND

A variety of legal, social and commercial efforts have taken place over the past 50 years and more, aimed at the removal of sulfides from fossil fuels. In the U.S., the Clean Air Act of 1964 and its evolution of amendments has been a major driving force in these efforts. Despite the benefits of low sulfide fossil fuels, the associated costs, undesirable changes to conventional methods of manufacture, which may impose unreliability and inefficiency of attempted improvements, have been a hindrance to progress and to obtaining the benefits from desulfurization of sulfur fuel. Some of this unreliability and inefficiency has been related to the control of temperature, pressure, corrosion and power in the chamber of the ultrasonic transducer, which in turn affects the performance of an ultrasonic horn for use in oxidative desulfurization of fossil fuels.

There remains a need for efficient and effective devices and methods for desulfurization. The present invention provides apparatus and methods for desulfurization using an ultrasonic horn.

SUMMARY OF THE INVENTION

In one aspect of the invention, an apparatus may comprise a chiller-heater exchanger for circulating a dielectric coolant through an ultrasonic transducer and horn chamber (e.g., cooling chamber for the magnetostrictive or transducer portion of the ultrasonic device). In various embodiments, the dielectric coolant is a fluorocarbon. In other embodiments, the coolant is a hydrofluoroether (HFE) compound.

In some embodiments, the coolant is circulated through an ultrasonic chamber and horn (e.g., below transducer, magnetostructure side of the device) which is in fluid communication (e.g., input and output) with the exchanger. Such an exchanger can heat/cool the coolant as desired. A fluorocarbon coolant provides an improved method to regulate temperature, pressure and corrosion of the ultrasonic horn. In some embodiments, the coolant reduces, reduces significantly or eliminates corrosion.

In further embodiments, given the anticorrosive properties of the coolant, the ultrasonic horn may not be required to comprise a protective or insulating layer in the form of a laminate or covering as is conventional. In additional embodiments, increased control of waveform frequency can be achieved through improved temperature regulation, as well as obviating the need for insulation or amount of insulation coating a horn. For example, the ultrasonic horn is capable of more effectively and efficiently dissipating heat to the coolant. Therefore, in some embodiments, an ultrasonic horn is able to function longer or at a more stable frequency; and more durably as it is resistant to corrosion.

In some embodiments, the coolant is circulated through a coolant chamber which may be in fluid communication (e.g., input and output) with the exchanger. Such an exchanger can heat/cool the coolant as desired. A fluorocarbon coolant provides an improved method to regulate temperature, pressure and corrosion of the ultrasonic transducer. In some embodiments, the coolant reduces, reduces significantly or eliminates corrosion.

In further embodiments, given the anticorrosive properties of the coolant, the transducer or horn of an ultrasonic transducer may not be required to comprise a protective or insulating layer in the form of a laminate or covering as is conventional. In additional embodiments, increased control of waveform frequency can be achieved through improved temperature regulation, as well as obviating the need for insulation or amount of insulation coating a transducer or horn. For example, the transducer is capable of more effectively and efficiently dissipating heat to the coolant. Therefore, in some embodiments, an ultrasonic transducer is able to function longer or at a more stable frequency; and more durably as it is resistant to corrosion.

A method of desulfurization of a material comprising sulfur may comprise administering ultrasonic energy to the material as it passes through continuous flow through the ultrasonic energy.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

In general, products and processes of the invention are directed to an effective and improved means for operating an ultrasonic transducer. Aspects of the invention are directed to controlling temperature, pressure, power, dielectric properties (e.g., safety benefits and enhancing heat transfer efficiency), and corrosion (e.g., oxidative) of the chamber environment surrounding an ultrasonic transducer.

Methods and Apparatuses

In various embodiments, methods and apparatus of the invention provide temperature control or enhanced temperature control, control of pressure, elimination, abatement or reduction of corrosion and enhanced power of an ultrasonic transducer (including space within the ultrasonic transducer chamber and the parts it contains).

Figure 1:
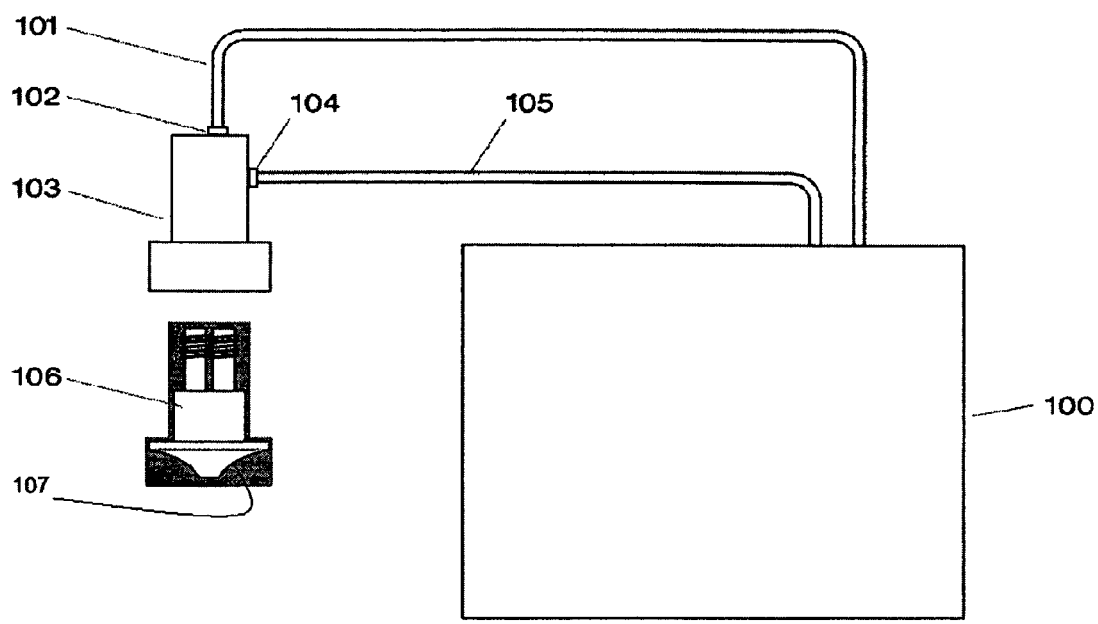
FIG. 1 illustrates a chiller-heater exchange device of the invention (100: chiller-heater exchanger; 101: channel flowing to ultrasonic horn chamber; 102: intake port to chamber; 103: cooling jacket assembly; 104: outflow port; 105: channel for circulating coolant back to exchanger; 106: ultrasonic horn with magnetostrictive laminates and windings; 107: flange/adaptor for mating with reaction chamber).

As illustrated in FIG. 1, in one embodiment, an apparatus of the invention is comprised of (1) a chiller-heater exchange device, which outputs (2) coolant to the ultrasonic transducer chamber and subsequently recycles the same fluid that has been heated in the (4) chamber via a return (3) connection. In a further embodiment, the coolant may be continuously replenished within the ultrasonic transducer chamber by being recirculated in the apparatus (e.g., a closed loop system). The present application describes a hydrofluoroether (HFE) compound and the use of the hydrofluoroether compound as a heat-transfer fluid. The hydrofluoroether compound may be used to heat, cool, and/or maintain the temperature of the device at a select temperature. The hydrofluoroether compound is inert, non-flammable, and environmentally acceptable. Additionally, the hydrofluoroether compound of the present invention exhibits low viscosity throughout the liquid range, and has good heat transfer properties over a wide temperature range. In various embodiments, an ultrasonic transducer cooled with a coolant described above is utilized in a method of desulfurizing fossil fuels.

In one embodiment, an ultrasonic transducer and horn chamber is formed wherein the ultrasonic horn is encased in a coolant jacket.

In another embodiment only a transducer of the ultrasonic transducer (which may also be referred to as the ultrasonic horn) may be encased within the coolant jacket.

In one embodiment, the apparatus comprises a heater-chiller exchanger and fluorocarbon fluid. The apparatus provides increased longevity (e.g., life-span), improved reliability and performance of the transducer and horn.

In one embodiment, the ultrasonic device of the invention, which is cooled with a coolant as described herein, is utilized in a method of desulfurizing fossil fuels or producing desulfurized fossil fuels.

a. Liquid Fossil Fuels

The term "liquid fossil fuels" is used herein to denote any carbonaceous liquid that is derived from petroleum, coal, or any other naturally occurring material and that is used to generate energy for any kind of use, including industrial uses, agricultural uses, commercial uses, governmental uses, and consumer uses. Included among these fuels are automotive fuels such as gasoline, diesel fuel, jet fuel, and rocket fuel, as well as petroleum residuum-based fuel oils including bunker fuels and residual fuels. Bunker fuels are heavy residual oils used as fuel by ships and industry and in large-scale heating installations. No. 6 fuel oil, which is also known as "Bunker C" fuel oil, is used in oil-fired power plants as the major fuel and is also used as a main propulsion fuel in deep draft vessels in the shipping industry. No. 4 fuel oil and No. 5 fuel oil are used to heat large buildings such as schools, apartment buildings, and office buildings, and large stationary marine engines. The heaviest fuel oil is the vacuum residuum from the fractional distillation, commonly referred to as "vacuum resid," with a boiling point of 565° C. and above, which is used as asphalt and coker feed. The present invention is useful in reducing the sulfur content of any of these fuels and fuel oils. In certain embodiments of the invention, the liquid fossil fuel is diesel fuel, either straight-run diesel fuel, rack diesel fuel (diesel fuel that is commercially available to consumers at gasoline stations), and blends of straight-run diesel and light cycle oil in volume ratios ranging from 50:50 to 90:10 (straight-run:light cycle oil). In further embodiments, the fossil fuel is crude fuel, including sour crude, sweet crude or light sweet crude.

In yet other embodiments, apparatus and methods of the invention are applied to any sulfur containing, low sulfur containing, or ultra low sulfur containing fuels.

b. Chiller-Heater

In one embodiment, the chiller-heater device is capable of delivering chilled fluid that is about −20 C to an ultrasonic transducer chamber, and is also capable of processing return fluid of about 120 C or less for subsequent re-delivery to said chamber. In another embodiment, the chiller-heater device is capable of delivering chilled fluid that is about −150, −125, −124, −123, −122, −121, −120, −19, −118, −17, −116, −115, −114, −113, −112, −111, −110, −100, −99, −98, −97, −96, 95, −94, −93, −92, −91, −90, −89, −88, −87, −86, −85, −84, −83, −82, −81, −80, −79, −78, −77, −76, −75, −74, −73, −72, −71, −70, −69, −68, −67, −66, −65, −64, −63, −62, −61, −60, −59, −58, −57, −56, −55, −54, −53, −52, −51, −50, −45, −40, −35, −30, −25, −20, −15, −10, −5, 0, 5 or 10 C; and is also capable of processing return fluid of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 100, 110, 125, 130, 135, 140, 145, 150, 155, 160, 170, 180, 190, 200, 210, 215, 220, 225, 230, 235, 240, 250, 260 or 275 C. Therefore, in various such embodiments, the coolant is capable of reaching temperatures as disclosed herein. Such exchangers are commercially available and readily adaptable to the devices and methods of the invention. Examples of such exchangers are provided in U.S. Pat. Nos. 7,255,160; 7,257,958; 7,059,137; 7,246,940; and 4,301,968.

c. Coolant

In one embodiment, the coolant fluid is a fluorocarbon or hydrofluoroether compound with boiling point less than 145 C and pour point greater than −50 C at STP (standard temperature and pressure at 1 atmosphere), which prevent corrosion, are strong dielectrics and are flexible enough in boiling and pour points to enable the changes in temperature required to enhance the overall process. Thus, the apparatus of the invention comprises a heat-transfer fluid that preferably performs well at both low and high temperatures (i.e., preferably has good heat transfer properties over a wide temperature range), is inert (i.e., is non-flammable, low in toxicity, non-chemically reactive), has high dielectric strength, has a low environmental impact, and has predictable heat-transfer properties over the entire operating temperature range. In various embodiments, the coolant obviates limitations associated with conventional coolant fluids, e.g., deionized water, water/glycol mixtures, such as corrosion. Furthermore, devices and systems of the invention comprise a coolant that provides a substantially inert environment, thus preventing corrosion associated with conventional coolants.

Therefore, the coolant utilized to cool the ultrasonic transducer is earth friendly or green and has a boiling point less than about 145° C. and pour point greater than −50 C at STP. For example, the coolant is non-ozone depleting, is not a volatile organic compound (VOC) and is approved without restrictions under the US EPA's Significant New Alternatives Program (SNAP). For example, in various embodiments, a coolant is an HFE having a short atmospheric lifetime and low global warming potential (GWP), a relatively higher boiling point (e.g., compared to water) which reduces evaporative losses and its lower density which reduces the amount of fluid to fill an ultrasonic transducer machine. Furthermore, the corrosive properties associated with other coolants (e.g., water) are obviated by utilizing HFE. Further examples include HFEs disclosed in U.S. Pat. No. 7,055,579, which is incorporated herein in its entirety. Furthermore, any safety issues with having high voltage electricity running near or with an electrical conducting coolant (e.g., water) are obviated.

In addition, a wide liquid range (−138° C. to 76° C.) makes HFE-7200 well-suited to thermal management applications for ultrasonic transducers of the invention. In addition, HFE-7200 fluid has a very low global warming potential (GWP) and offers reduced greenhouse gas emissions when compared to PFCs—without sacrificing performance.

Another advantage to utilizing the fluorocarbons as a liquid coolant in the apparatuses of the invention is their dielectric characteristics. A dielectric is an electrical insulator in that it is highly resistant to the flow of an electric current. As such, coolants disclosed herein further reduce or eliminate corrosion that is otherwise observed in prior art ultrasonic transducer and horns.

d. Ultrasonic Transducer

Ultrasonic devices of the invention are configured to be directly immersed in the cooling liquids disclosed herein. In one embodiment, an ultrasonic transducer and horn chamber is configured to have an input and output channel for the liquid coolant which channels are operatively linked to a chiller-heater exchanger.

Exemplary ultrasound used in accordance with this invention can produce sound-like waves whose frequency is above the range of normal human hearing, i.e., above 20 kHz (20,000 cycles per second). Ultrasonic energy with frequencies as high as 10 gigahertz (10,000,000,000 cycles per second) has been generated, but for the purposes of this invention, useful results will be achieved with frequencies within the range of from about 15 kHz to about 200 kHz, and preferably within the range of from about 15 kHz to about 50 kHz. Ultrasonic waves can be generated from mechanical, electrical, electromagnetic, or thermal energy sources. The intensity of the sonic energy may also vary widely. For the purposes of this invention, best results will generally be achieved with an intensity ranging from about 30 watts/cm$^2$ to about 300 watts/cm$^2$, or preferably from about 50 watts/cm$^2$ to about 100 watts/cm$^2$. The typical electromagnetic source is a magnetostrictive transducer 106 which converts magnetic energy into ultrasonic energy by applying a strong alternating magnetic field to certain metals, alloys and ferrites. The transducer is cooled by the coolant circulated via the chiller-heater exchanger 100. Furthermore, the transducer 106 can be fitted with an adaptor, such as a flange 107 so as to couple the device to a reaction chamber (not shown). In one embodiment, the coolant is circulated through a cooling jacket assembly 103. Thus, in one example, the flange 107 'mates' with the reactor chamber flange (which brings the sulfur containing compound or other fluid to be treated past the ultrasonic device of the invention).

In other embodiments, the transducer/horn is in direct contact with the coolant, where the transducer/horn is coupled to a cooling chamber with in/out ports for circulating the coolant. For example, the transducer can function just as well where in direct contact with the coolant (e.g., HFE).

Figure 2:
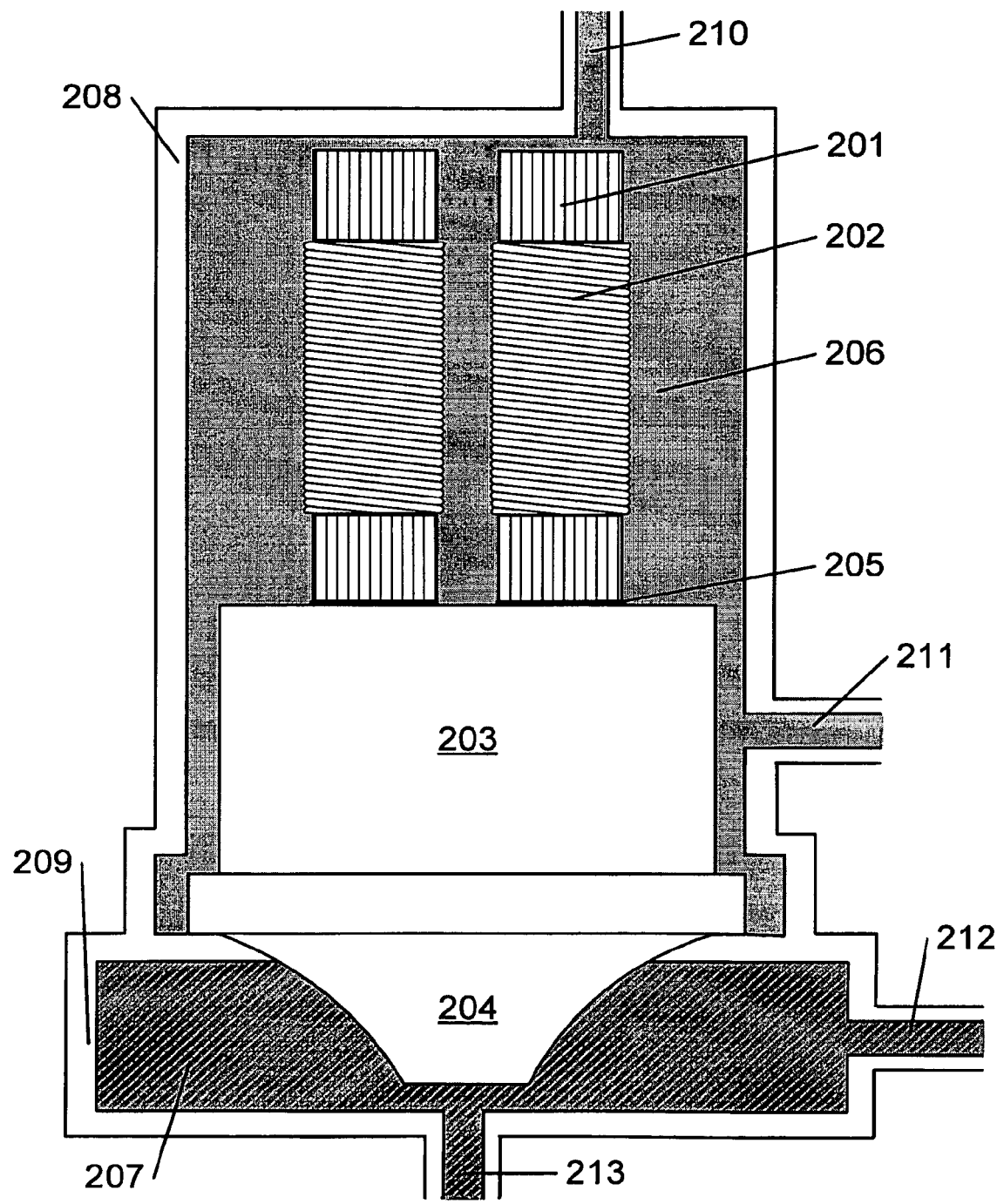
FIG. 2 illustrates an ultrasonic transducer assembly of the invention (201: stack; 202: coil; 203: horn waveguide; 204: horn flange; 205: connector; 206: coolant; 207: material to be desulfurized; 208: cooling chamber; 209: reaction chamber; 210: cooling chamber inlet; 211: cooling chamber outlet; 212: reaction chamber outlet; 213: reaction chamber inlet).

FIG. 2 shows an example of an ultrasonic transducer assembly (which may also be referred to in some places as an ultrasonic horn) where the transducer and horn are in direct contact with the coolant. The transducer may be formed of stacks 201 that are wound with a coil 202. In some instances a stack 201 is formed of magnetostrictive material, such as a soft magnetic alloy. Soft magnetic alloys may be alloys that become magnetic in the presence of an electric field but retain little or no magnetism after the field is removed. Some examples are iron-silicon alloys, iron-silicon-aluminum alloys, nickel-iron alloys, and iron-cobalt alloys, which may contain additional alloying elements such as chromium, vanadium, and molybdenum. See e.g., U.S. Pat. No. 7,275,440, which is hereby incorporated by reference in its entirety. The coil 202 may be an electric coil across which a voltage, such as an oscillating voltage, may be imposed. For example, a coil may include a wire wrapped in an insulative layer or coating, such as rubber. An oscillating voltage may produce ultrasonic vibrations in the coil, and the vibrations may be transmitted through a waveguide 203 portion of a horn to a flanged horn 204.

The stack 201 may be formed of thin, flat plates. The plates may have any thickness, dimensions or shape. In some instances, the plates may be loop-shaped with an elongated opening that may permit the passage of an electrical wire to form coils on each side of the opening. The desired number of plates may be adjacent to one another to form a stack. As discussed elsewhere, no need exists for a protective or insulating laminate, layer or adhesive. Thus, the plates of a stack 201 may be adjacent to one another and may directly contact coolant 206 without a surrounding layer. Furthermore, the plates, without a protective laminate or adhesive, may directly contact one another. Thus, a non-insulated ultrasonic transducer may be provided.

The stack 201 may be joined to a horn, which may include a waveguide 203 portion of the horn, which may be in contact with a flanged portion of the horn 204. The stack of plates may somehow be connected or joined to the waveguide. For instance a stack 201 may be joined to a waveguide 203 by brazing 205.

A cooling chamber 208 (which may also be referred to in some places as an ultrasonic transducer and horn chamber) may include a jacket or housing that may surround the ultrasonic transducer. The cooling chamber may contain a coolant 206 that may contact the stack 201, coil 202, waveguide 203, and horn flange 204. As mentioned elsewhere, the coolant may be a dielectric coolant, such as a fluorocarbon or hydrofluoroether compound (non-oil), in contrast to prior art coolants that used oils or were oil-based.

The coolant may circulate within the cooling chamber. The coolant may pass continuously through the cooling chamber. In some instances, the coolant may flow in through one or more inlet and out one or more outlet. For example, an inlet 210 may enable a coolant to enter the cooling chamber 208 and an outlet 211 may enable the coolant to exit the cooling chamber 208. There may be any number of inlets and outlets, and they may have any position on the cooling chamber. For example, the locations of the inlet 210 and the outlet 211 may be switched.

A flanged portion of a horn 204 of an ultrasonic transducer may be connected to a reaction chamber 209. For instance, the distal end of the horn may extend into the interior of the reaction chamber. A material to be desulfurized 207 may be within the reaction chamber. For example, a cooling jacket may encase a reaction chamber. For instance, the material to be desulfurized may be a liquid fossil fuel, as discussed elsewhere. The material 207 may contact the distal end of the horn 204. In some implementations, the material 207 may be continuously flowing through the reaction chamber 209 as mentioned elsewhere. The material may enter the reaction chamber through an inlet 213 and leave the reaction chamber through an outlet 212. A reaction chamber may have any number of inlets and/or outlets which may be placed at any location of the reaction chamber. For instance, the positions of the inlet 213 and outlet 212 may be switched.

The cooling chamber 208 and the reaction chamber 209 may have any configuration with respect to one another. In some instances the cooling chamber may rest upon the reaction chamber. In others, a cooling jacket or housing may reside outside the reaction chamber. The cooling chamber and reaction chamber may or may not be adjacent to one another or in contact with one another.

Figure 3:
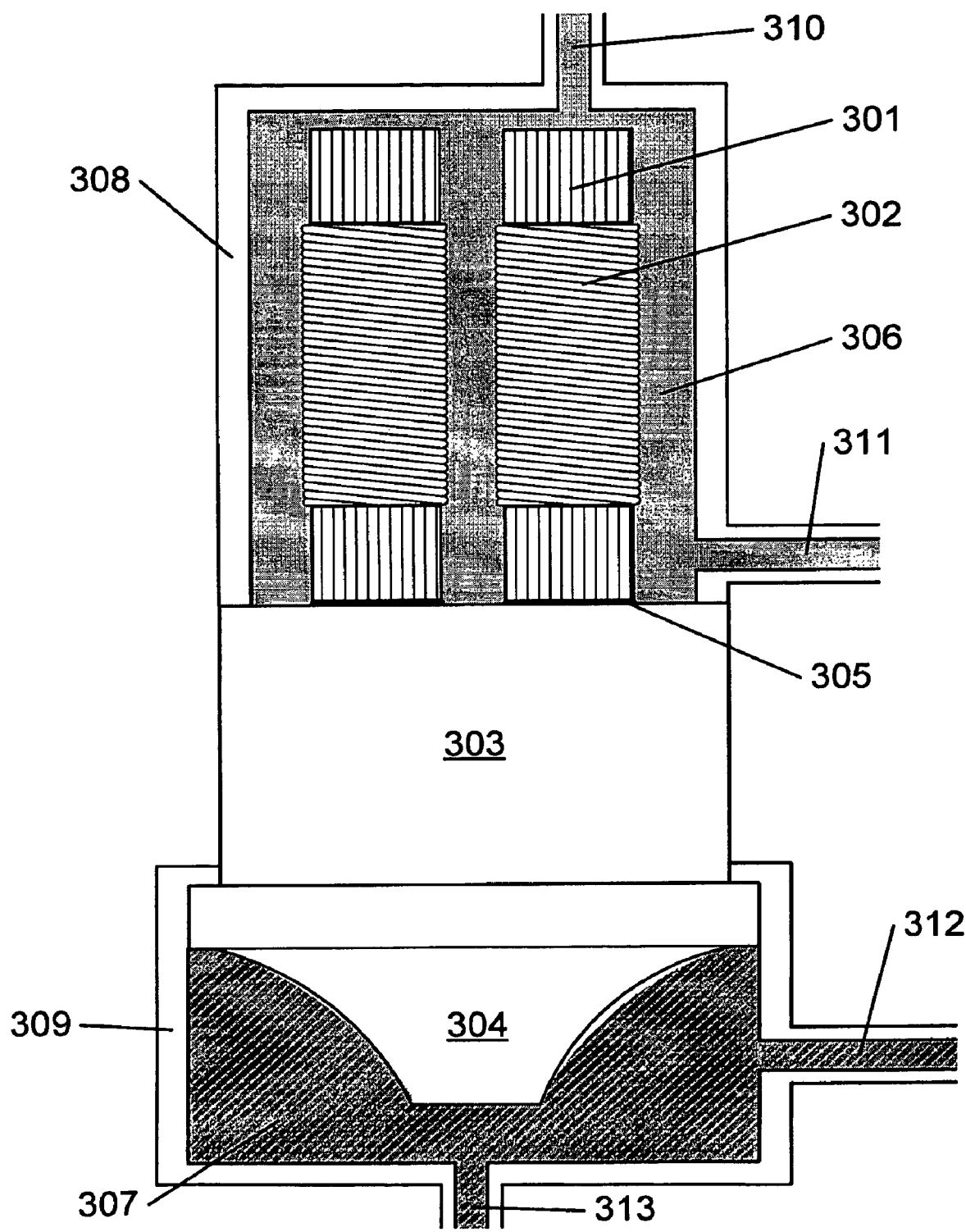
FIG. 3 illustrates another probe assembly of the invention (301: stack; 302: coil; 303: horn waveguide; 304: flanged horn; 305: connector; 306: coolant; 307: material to be desulfurized; 308: coolant jacket; 309: ultrasonic chamber; 310: coolant jacket inlet; 311: coolant jacket outlet; 312: ultrasonic chamber outlet; 313: ultrasonic chamber inlet).

FIG. 3 provides another example of a probe assembly. For example, a probe may include a transducer comprising one or more stacks 301 looped with one or more coils 302. A probe may also include a waveguide 303 portion of the horn and a flanged horn 304. The transducer may be connected to the waveguide by brazing 305 or by any other joining or connecting mechanism. The transducer may be enclosed within a coolant jacket 308. A non-insulated probe may be provided when the stacks 301 may be made up of a plurality of plates without any protective or insulating layers, laminates, or coatings. At least a portion of the horn 304 may be within an ultrasonic chamber 309.

In some embodiments, the transducer may be cooled by a coolant 306 within the coolant jacket 308. The coolant may be continuously flowing. For example, the coolant may enter through an inlet 310 and exit through an outlet 311. Any number of inlets or outlets may be used, and they may be positioned anywhere on the coolant jacket.

At least a portion of the horn 304 of the ultrasonic transducer may be within an ultrasonic chamber 309. A material 307 may be within the ultrasonic chamber. The material may be a material to be desulfurized, such as a liquid fossil fuel, as discussed elsewhere. The material may be continuously flowing through the ultrasonic chamber. For instance, the material may enter the ultrasonic chamber through an inlet 313 and may leave the ultrasonic chamber through an outlet 312. Any number of inlets or outlets may be used, and they may be positioned anywhere along the ultrasonic chamber.

Figure 4:
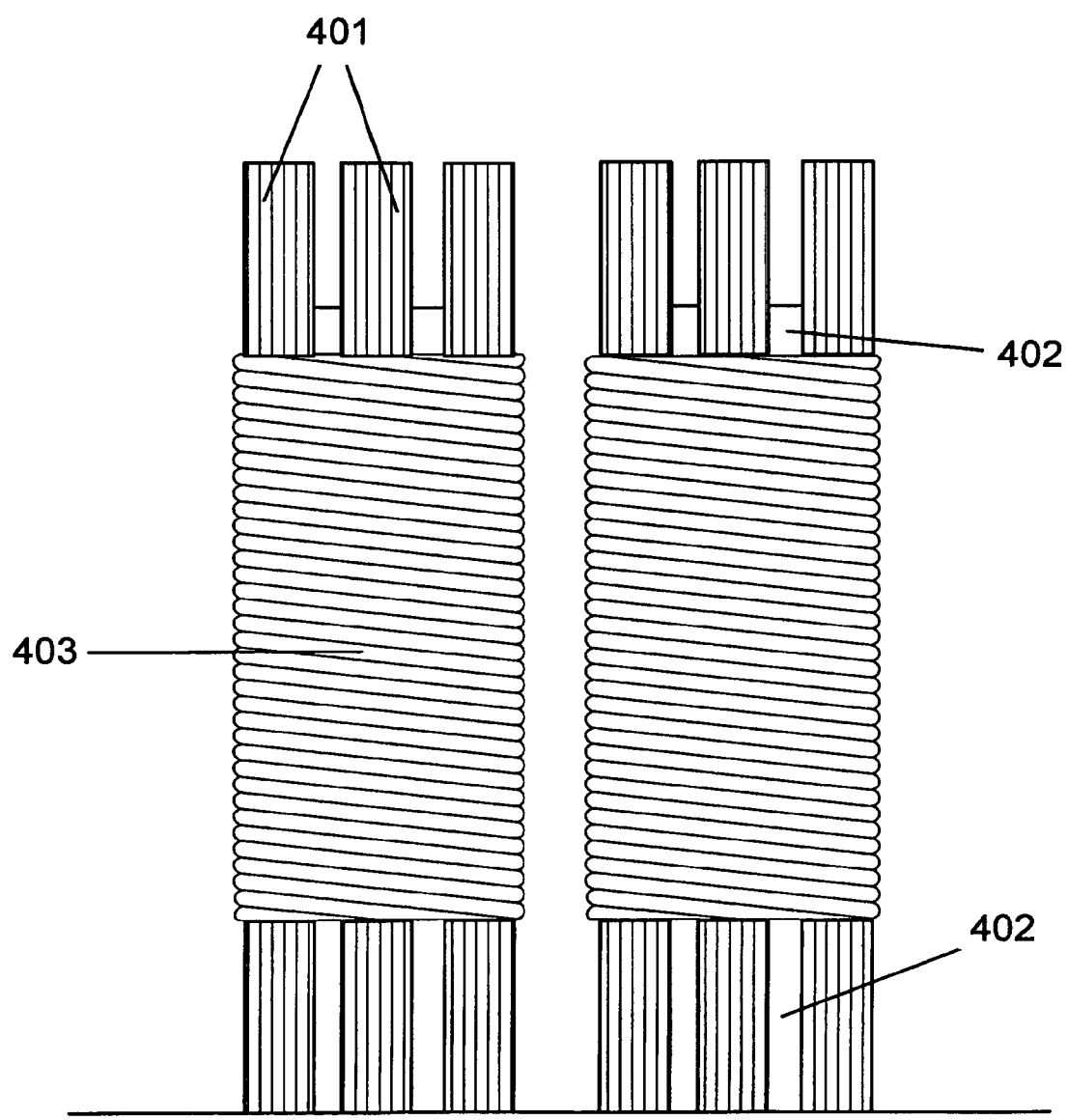
FIG. 4 illustrates a transducer assembly of the invention (401: stack; 402: spacer; 403: coil).

FIG. 4 shows an example of a non-insulating transducer formed of stacks 401 and coils 403. In some embodiments of the invention, the stacks may be formed of plates formed of a magnetostrictive material, as discussed previously. The stack plates (e.g., naked plates) may be uncovered or unlaminated, or may be combined without coatings, insulation, or adhesives. The plates of the stacks may be adjacent to one another without any layers or coatings coming between them. The stacks may also not have any layers or coatings covering the plates such that the plates of the stack may directly contact a coolant or anything else surrounding the stacks. In some embodiments, the stacks may be held together by the coils. In other embodiments, the stacks may be tied together by an additional tying mechanism. In some instances the stacks may be tightly tied together. In others, they may be tied together such that some spaces may exist between the plates of the stacks. In some instances, when the stacks vibrate, some spaces may be created between the plates, thereby allowing coolant to penetrate between the plates and directly contact the plates. In some implementations, slight spacing may be provided between the plates at the bottom of a stack, where they may be connected, joined, or brazed to a surface. Thus, plates within a stack may have direct exposure to coolant without having any laminates, layers or coatings that may come between them and the coolant.

In some instances, the stacks looped within a coil may be tied together in one big group. Alternatively, the stacks looped within a coil may be tied in multiple groupings. The groupings may be separated by a gap. In some instances, the gap may facilitate cooling by providing additional surface area for contact with a coolant. In some instances, the gap may be created by some sort of spacers 402. The spacers 402 may be of any form or material that may enable a gap to be created between different groups. In some instance, the spacers may be formed of a dielectric material.

Another typical electrical source is a piezoelectric transducer, which uses natural or synthetic single crystals (such as quartz) or ceramics (such as barium titanate or lead zirconate) and applies an alternating electrical voltage across opposite faces of the crystal or ceramic to cause an alternating expansion and contraction of crystal or ceramic at the impressed frequency.

A transducer can be powered by any oscillating voltage. The oscillations can be a continuous waveform oscillation such as sinusoidal wave or a series of pulses such as rectangular waveform pulses. By "rectangular waveform" is meant a direct current voltage that alternates through stepwise voltage changes between a constant positive value and a baseline value. Rectangular waveforms that are preferred in the practice of this invention are those in which the baseline is a negative voltage rather than a zero voltage, and preferably those in which the alternating positive and negative voltages are of the same magnitude. In some embodiments, the voltage is from about 140 volts to about 400 volts, and preferably about 220 volts single-phase, and the preferred wattage is from about 1 kilowatt to about 17 kilowatts. The frequency of the voltage oscillation will be selected to achieve the desired ultrasound frequency. For example, the frequencies are in the range of about 10 to about 50 megahertz, with a range of about 15 to about 30 megahertz preferred. Any transducer that would benefit from enhanced control of temperature, pressure or the prevention of corrosion could be utilized in the present systems and methods.

Ultrasound has wide applications in such areas as cleaning for the electronics, automotive, aircraft, and precision instruments industries, flow metering for closed systems such as coolants in nuclear power plants or for blood flow in the vascular system, materials testing, machining, soldering and welding, electronics, agriculture, oceanography, and medical imaging. The various methods of producing and applying ultrasonic energy, and commercial suppliers of ultrasound equipment, are well known among those skilled in ultrasound technology and such as disclosed in U.S. Pat. Nos. 6,402,939; 6,500,219; 6,652,992; and U.S. Patent Application Publication Nos. 2006/0260405, 2006/0196915 and 2005/0274600, 2003/0051988, and 2004/0079680.

The ultrasonic transducer and ultrasonic horn 106 in particular can be of any conventional shape and size that may be known in the prior art for ultrasonic horns. The horn may for example be cylindrical, preferably of circular cross section as indicated above, and suitable lengths may range from about 4 cm to about 100 cm (including half wave or full wave horns), depending on the reactor size, or from about 10 cm to about 50 cm, with a diameter of from about 3 cm to about 30 cm, or from about 5 cm to about 15 cm. For example, a block on which an ultrasonic horn is disposed, can serve as both a mechanical connection that transmits the ultrasound vibrations from the transducer to the horn and an amplifier can likewise vary in its dimensions. For example, a suitable length range is about 5 cm to about 100 cm, and most preferably from about 10 cm to about 50 cm, with its widest diameter ranging from about 3 cm to about 30 cm, and preferably from about 5 cm to about 15 cm. The horn is adaptable to a reaction chamber through various fittings conventional in the art.

In various embodiments, an ultrasonic chamber can provide continuous flow of the material to be desulfurized. For example, the material (e.g., crude resin or diesel fuel) to be treated follows a flow path that sweeps across a reaction chamber configured to couple to an ultrasonic horn 106, with a continuous, constant flow and little or no dead volume. The reaction chamber can be of any size, geometry or dimensions, so long as it is configured to receive the ultrasonic horn.

Generally, the ultrasound generates heat, and with certain fossil fuels it is preferable to remove some of the generated heat to maintain control over the reaction. However, with the present invention, the given apparatus is configured to provide a coolant that is anti-corrosive; there is no need to provide an ultrasonic horn with a protective or insulating laminate, layer or adhesion. Therefore, in various embodiments apparatus of the invention provide a coolant to regulate the temperature in the ultrasonic chamber while concomitantly reducing or eliminating corrosion in the ultrasonic chamber. In other embodiments, the ultrasonic chamber is itself encased in a cooling jacket which provides circulation of the coolant disclosed herein to and from the ultrasonic chamber from the chiller-heater exchanger.

As indicated in FIG. 1, the ultrasonic transducer and horn chamber is directly in contact with the coolants disclosed herein. Furthermore, as the coolant is anti-corrosive and no protective layer is required for the horn, heat is dissipated from the horn more efficiently thus allowing prolonged and more durable operation (e.g., no overheating). For example, transducers can comprise a protective layer of a laminate material or silicone such as disclosed in U.S. Pat. No. 7,033, 673. Apparatus of the invention can be configured to not contain such protective coatings owing to the anticorrosive properties of the coolant disclosed herein.

When cooling is achieved by immersing the ultrasound chamber in a coolant bath or circulating coolant, the coolant may be at a temperature of about 50° C. or less, about −50° C. or less, or about −120° C. Other operating conditions in the ultrasound chamber can vary as well, depending on the material being treated and the throughput rate. The pH of the emulsion, for example, may range from as low as 1 to as high as 10, although best results are generally achieved within a pH range of 2 to 7. The pressure of the emulsion as it is exposed to ultrasound can likewise vary, ranging from subatmospheric (as low as about 0.2 psia to about 5 psia or 0.34 atmosphere) to as high as 3,000 psia (214 atmospheres). In some embodiments, the pressure is less than about 400 psia (27 atmospheres), or less than about 50 psia (3.4 atmospheres). In further embodiments, the pressure is from about 1 psia atmospheric pressure to about 50 psia. For example, the pressure may be 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 or 50 psia.

An advantage of the present invention is that the process and equipment can treat fossil fuels, petroleum fractions, with prolonged operation of the ultrasonic horn. The dielectric coolant provides enhanced temperature regulation and based on the anticorrosive properties, the horn is not required to be coated with any protective layer. As such, the horn more efficiently dissipates heat and is more effectively cooled thus allowing prolonged operation. As such a greater volume of an emulsion (e.g., fuel emulsion) is able to be processed over a given period of time. For example, in various embodiments, throughput rates of the oil phase are from about 5 to about 500 gallons (U.S.) per minute (about 0.3 to about 30 L/sec), and most preferred are from about 8 to about 160 gallons (U.S.) per minute (about 0.5 to about 10 L/sec).

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An apparatus configured to provide enhanced regulation of temperature and corrosion comprising:
    an ultrasonic transducer comprising one or more stacks, wherein a stack comprises a plurality of plates without the use of adhesives or coatings positioned therebetween; and
    a coolant in direct contact with the plurality of plates.

2. The apparatus of claim 1, further comprising a chiller-heater exchanger component in fluid communication with a cooling chamber wherein said cooling chamber is cooled by the coolant.

3. The apparatus of claim 2, wherein the fluid communication is provided by a channel for receiving the coolant from said cooling chamber and a channel for delivering coolant to said cooling chamber.

4. The apparatus of claim 1, wherein said coolant is a dielectric coolant.

5. The apparatus of claim 1, wherein said coolant is a fluorocarbon.

6. The apparatus of claim 1, wherein said coolant is a hydrofluoroether.

7. The apparatus of claim 1, wherein said coolant has a boiling point less than 145° C. and pour point greater than −50° C. at STP.

8. The apparatus of claim 1, wherein the coolant is in direct contact with a horn of the ultrasonic transducer.

9. A method for emitting ultrasonic energy through a fuel material comprising:
    conducting an ultrasonic transducer to emit ultrasonic waves through said fuel material; and
    cooling said ultrasonic transducer by circulating a coolant that directly contacts the ultrasonic transducer,
    wherein the ultrasonic transducer comprises one or more stacks, wherein a stack comprises a plurality of plates without any protective or insulating coating positioned therebetween.

10. The method of claim 9, wherein said fuel material is a sulfur containing fuel.

11. The method of claim 9, wherein said coolant is directly in contact with the one or more stacks.

12. The method of claim 9, wherein said coolant is comprised in a cooling jacket which surrounds at least a portion of the ultrasonic transducer.

13. The method of claim 9, wherein said coolant reduces or prevents corrosion of said ultrasonic transducer.

14. The method of claim 9, wherein said coolant is a dielectric coolant.

15. The method of claim 9, wherein said coolant is a hydrofluoroether.

16. The method of claim 9, wherein said coolant is a fluorocarbon.

17. The method of claim 9, wherein said conducting results in oxidative desulfurization of said fuel.

18. The method of claim 9, wherein said coolant has a boiling point less than 145° C. and pour point greater than −50° C. at STP.

* * * * *